United States Patent [19]

Famorca

[11] Patent Number: 5,544,745
[45] Date of Patent: * Aug. 13, 1996

[54] CASE FOR EXCHANGING AUDIBLE AND WRITTEN MESSAGES

[75] Inventor: Judith R. Famorca, 1990 Hawthorne Dr., Lot 197, N. Charleston, S.C. 29418

[73] Assignee: Judith R. Famorca, Summerville, S.C.

[ * ] Notice: The portion of the term of this patent subsequent to Apr. 10, 2010, has been disclaimed.

[21] Appl. No.: 975,401

[22] Filed: Nov. 10, 1992

[51] Int. Cl.⁶ .................................................. B65D 85/575
[52] U.S. Cl. .................. 206/320; 206/703; 206/387.15; 206/806; 224/901; 224/572; 383/7; 383/40
[58] Field of Search .......................... 224/42.46, 253, 224/901; 135/65, 66, 67; 383/7, 22, 37, 39, 40; 206/232, 38, 320, 328, 387, 459.5, 460, 461, 466, 806, 701, 703, 705, 387.1, 387.14, 387.15

[56] References Cited

U.S. PATENT DOCUMENTS 4,896,805  1/1990  Klaczak et al. .............. 224/253 X
5,040,711  8/1991  Niederhauser et al. ............. 224/42.46
5,154,331  10/1992  Sanders ................................ 224/42.46

*Primary Examiner*—Jacob K. Ackun

[57] ABSTRACT

A case for transmitting audible and written messages, the case comprising end panels, a bottom panel, contrapositioned walls defining a rear wall adjacently positioned to the rail of a bed and a front wall affixed together to form an open container in which written messages may be cataloged. The rear wall includes a flap which extends over the rail of a bed, holding the case thereto. Affixed to an exterior portion of the front wall are a plurality of cassette pockets for holding audio cassettes and a detachable recorder pocket, holding an audio cassette recorder, for receiving and sending messages. Attachable to the arm of a wheel chair, the detachable recorder pocket includes straps having hook and loop type fastener. Messages are recorded and then reserved in the cassette pockets which are designated by name tags.

5 Claims, 4 Drawing Sheets

CASE FOR EXCHANGING AUDIBLE AND WRITTEN MESSAGES

FIELD OF THE INVENTION

This invention relates generally to the method of creating and exchanging audible and written messages, and most specifically, to a case attachable to a bed or wheel chair for accomplishing the method.

BACKGROUND OF THE INVENTION

When a person is bedridden because of illness, communication becomes fundamental to the patient's recovery. Often an ill person is detached from family and friends, and then loneliness and depression begin to stifle the healing process. The present invention provides a means allowing communication between an ill person, or invalid, and his or her physicians, nurses, friends and family. In accordance with the present invention, a case is developed providing a number of pockets for holding audio cassette recorders and cassettes. Messages are recorded and then reserved in designated recipient pockets. Written messages are catalogued in the interior of the case.

The art of creating and transmitting audio messages has been pursued since the invention of the audio recorder. Devices have been patented which allow a personalized message to be recorded and delivered to various types of recipients such as hospital patients. U.S. Pat. Nos. 4,878,871 to Noto and 4,710,145 to Hall-Vandis both disclose a doll in which is located a cassette recorder for recording a message. The doll is delivered to the intended recipient who plays the message.

Several storage devices have been developed which aid bedridden patients and invalids. U.S. Pat. Nos. 4,831,673 to Winckler and 4,129,909 to Riehl both disclose a device, attachable to a bed, in which various items are held. An article holder affixable to a walker is described in U.S. Pat. No. 4,184,618 to Jones. U.S. Pat. No. 4,577,903 to Wells discloses a bag which hangs from the handles of a wheel chair. And U.S. Pat. No. 4,339,061 to Dunn discloses a storage case attachable to the arm of a wheel chair.

While these devices perform well for their intended applications, they do not provide a case, attachable to a bed or arm of a wheel chair, allowing audio recording means and means for exchanging audible and written messages.

SUMMARY OF THE INVENTION

It is therefore an object of this invention to provide a device allowing a novel means of communication between an ill person, or invalid, and his or her physicians, friends and family members.

It is a further object of this invention to encourage communication between a child, an adult or a blind person and his or her physicians, friends and family members.

These, as well as other objects, are accomplished by a case for transmitting audible and written messages, the case comprising end panels, a bottom panel, contrapositioned walls defining a rear wall adjacently positioned to the rail of a bed and a front wall affixed together to form an open container in which written messages may be cataloged. The rear wall includes a flap which extends over the rail of a bed, holding the case thereto. Affixed to an exterior portion of the front wall are a plurality of cassette pockets for holding audio cassettes and a detachable recorder pocket, holding an audio cassette recorder, for receiving and sending messages. Attachable to the arm of a wheel chair, the detachable recorder pocket includes straps having hook and loop type fastener. Messages are recorded and then reserved in the cassette pockets which are designated by name tags.

BRIEF DESCRIPTION OF THE DRAWINGS

While the specification concludes with claims particularly pointing out and distinctly claiming the subject matter regarded as the invention, in light of the doctrine of equivalence, it is believed that the invention, the objects, features and advantages thereof will be better understood from the following description taken in connection with the accompanying drawings, in which:

DETAILED DESCRIPTION

Figure 1:
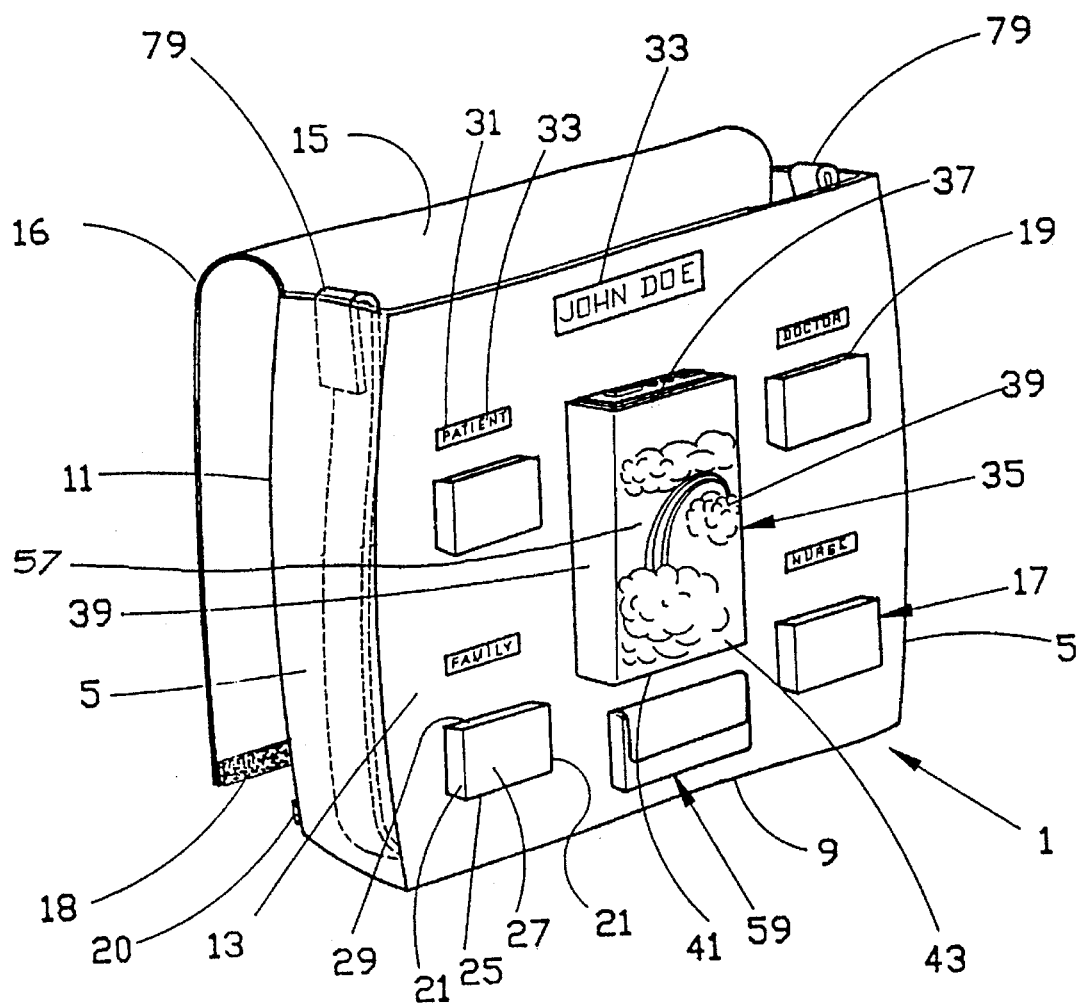
FIG. 1 of the drawings is, in accordance with the invention, a perspective view of a case for exchanging audible and written messages.

In accordance with this invention, FIG. 1 illustrates case 1 comprising two side panels 5, bottom panel 9, contrapositioned walls defining a rear wall 11 and a front wall 13 affixed together to form an open container 15. Rear wall 11 further defines flap 16 including along a bottom interior edge thereof fastening means 18. When case 1 is attached to the rail of a hospital bed, fastening means 18 engages fastening means 20 disposed along the bottom exterior edge of rear wall 11, as more clearly shown in FIG. 4. The fastening means utilized for the present invention may comprise any number of heretofore utilized materials such as the common hook and loop type fastener. Additionally, case 1 is comprised of vinyl or similar durable, water-resistant material. It is suggested that the case's color comprise a bright blue or similarly cheery color.

The present invention not only provides a means of communication, but encourages communication in the impersonal environments typical of hospitals and nursing homes. The case described herein is personalized with color coordinated name tags such that physicians, family members and friends all have designated pockets in which to leave messages for the patient. Referring back to FIG. 1, a number of cassette pockets 17 for holding audio cassettes 19 are affixed to the exterior of front wall 13. Cassette pockets 17 comprise end walls 21, bottom wall 25 and front wall 27 attached together to form an open receptacle 29. A plurality of identification windows 31 behind which name tags 33 are displayed are also attached to the exterior of front wall 13. Identification windows 31 include a top, a bottom and two ends defining substantially rectangular strips of transparent material wherein the top, bottom, and one end thereof are attached to the exterior of front wall 13 leaving an open end such that name tags 33 are inserted therethrough. As illustrated, identification windows 33 are disposed one above each of cassette pockets 17 and one of larger dimension centered towards the top exterior portion of front wall 13.

Figure 2:
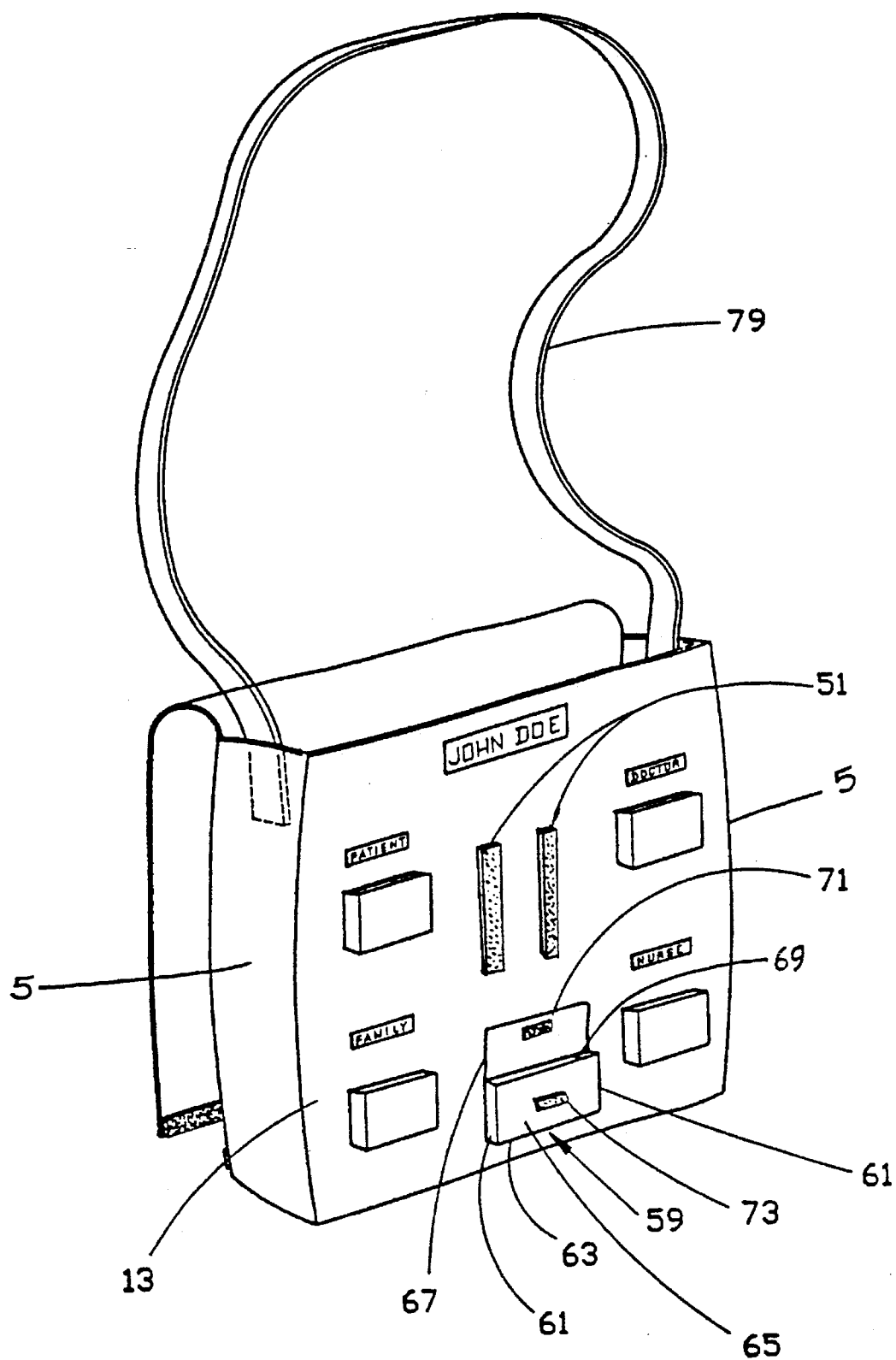
FIG. 2 of the drawings is a perspective view of the case showing a shoulder strap and a detached cassette recorder pocket.

For storing batteries battery pocket 59 is attached to the exterior of front wall 13 below detachable recorder pocket 35. As illustrated in FIG. 2 battery pocket 59 comprises end walls 61, bottom wall 63, front wall 65 and canopy 67 attached together to form a covered receptacle 69. Canopy 67 is attached to the exterior of front wall 13 and includes fastening means 71 along a front edge of an interior side thereof. Fastening means 71 engages fastening means 73 such that canopy 67 securely covers receptacle 69. Shoulder strap 79 allows case 1 to be conveniently portable. Shoulder strap 79 has two ends attached to the interior portion of top edges of each side panel 5. When not in use, shoulder strap 79 is storable in open container 15.

Figure 3A:
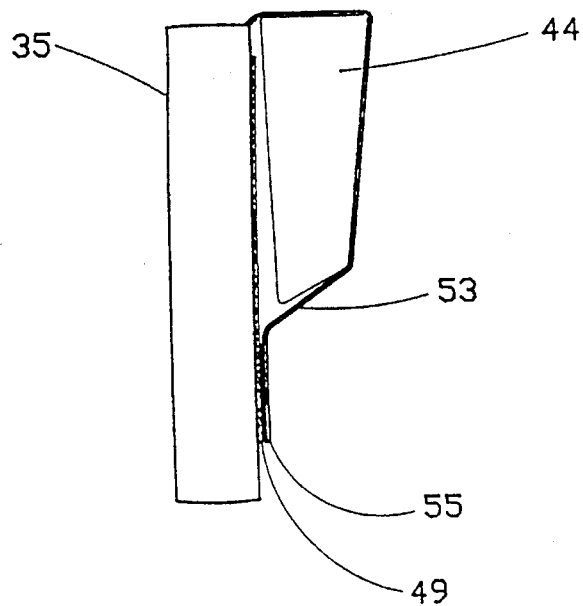
FIG. 3a of the drawings illustrates the detachable recorder pocket attached to the arm of a wheel chair.
Figure 3:
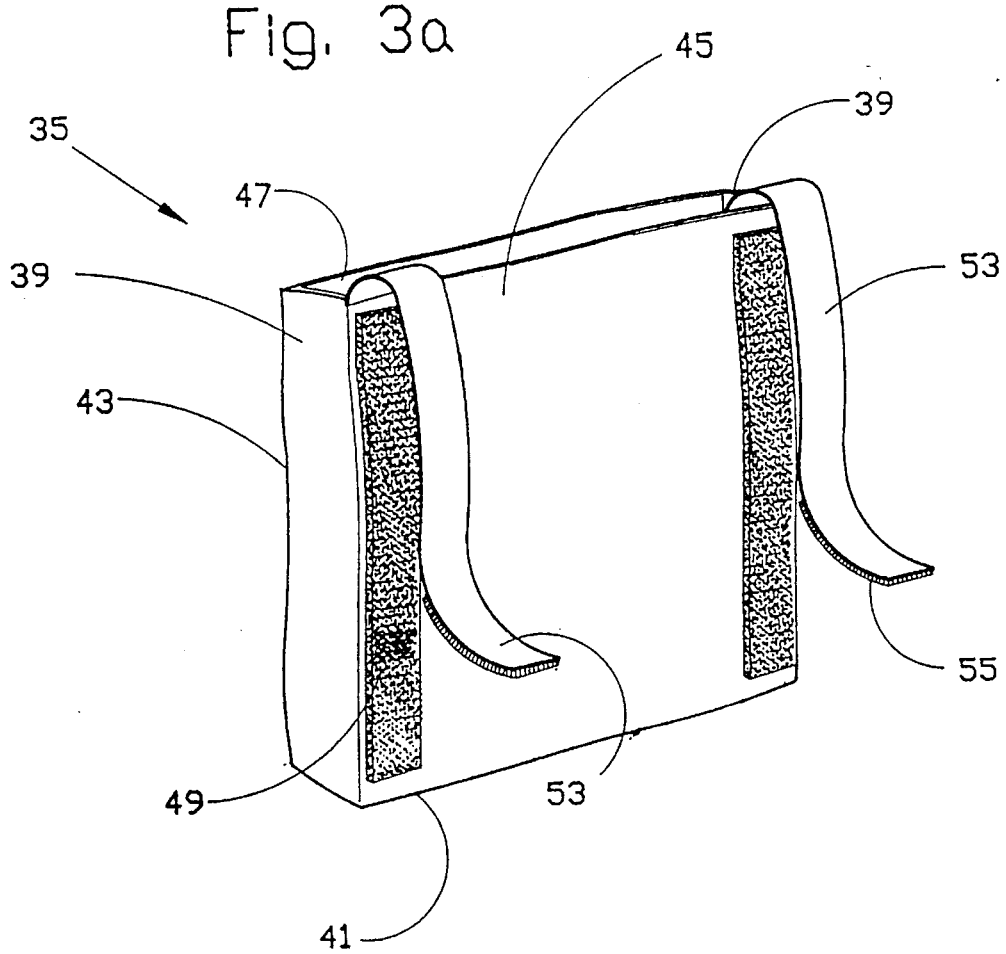
FIG. 3 of the drawings illustrates the detachable recorder pocket.

Detachable recorder pocket 35 stores and carries audio cassette recorder 37. As illustrated in FIG. 1, detachable recorder pocket 35 is affixed at the exterior mid-portion of front wall 13 between cassette pockets 17. FIG. 3 more closely illustrates detachable recorder pocket 35 comprising end walls 39, bottom wall 41 and contrapositioned walls defining a front wall 43 and a back wall 45 attached together to form an open receptacle 47. Vertically defined at each exterior side of back wall 45 are fastening means 49 which hold detachable recorder pocket 35 to front wall 13 by communicating with fastening means 51, as illustrated in FIG. 2, vertically located at the exterior mid-portion of front wall 13. Detachable recorder pocket 35 may be secured to the arm of a wheel chair 44 as shown in FIG. 3a. Straps 53 are attached to and extend from an interior portion of back wall 45 and are of such length as to wrap around the arm of a wheel chair or any other such object. Located at the tips of each strap 53 are fastening means 55 which engage fastening means 49 such that detachable recorder pocket 35 is firmly secured to any object to which it is attached such as the arm of a wheel chair, as illustrated in FIG. 3a. When not in use, straps 53 hang inside open receptacle 47. As illustrated in FIG. 1, a decorative design or illustration 57 provides an aesthetically soothing, bright and cheerful appearance to adults and children.

Figure 4:
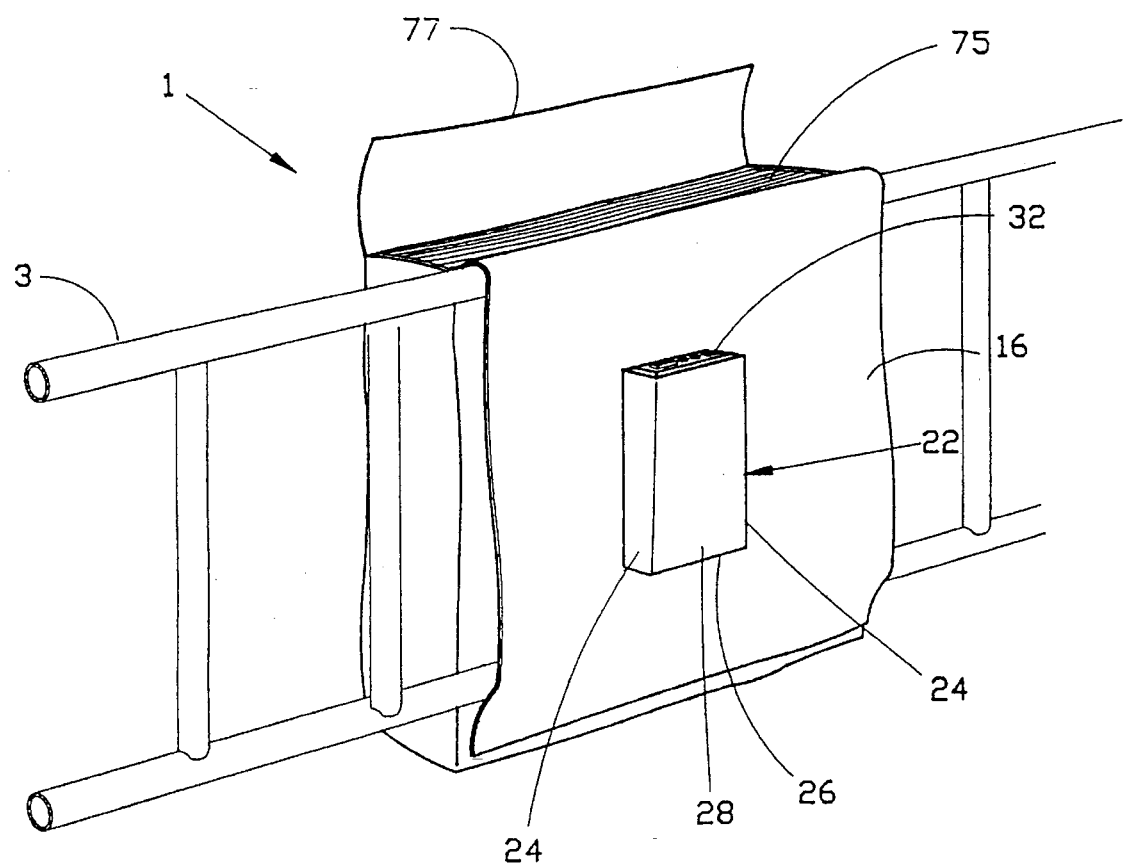
FIG. 4 of the drawings is a perspective rear view of the case attached to the rail of a hospital bed.

Referring now to FIG. 4, flap 16 includes at the exterior mid-portion thereof recorder pocket 22 comprising end walls 24, bottom wall 26 and front wall 28 attached together to form an open receptacle in which is stored audio recorder 32 which a patient uses to record messages for a designated recipient such as a physician, nurse or family member. Additionally, a patient may use audio recorder 32 to play tapes from his or her physician, nurse or family member. To provide comfort, motivational and musical tapes may be played as well. A voice-activated cassette recorder is used to equip blind persons with a hands-free means of recording messages for their physicians and loved ones.

Written messages, magazines or similar items are cataloged in divider 75, insertable into open container 15. The divider utilized herein is similar to those heretofore utilized in that alphabetized partitions are used to separate and index documents. Additionally, divider 75 allows letters, drawings and medical documents to be categorically stored for swift retrieval. Divider 75 includes flap 77 insertable into open container 15 such that messages are covered and protected.

As various modifications occur to those familiar with the art, such modifications may be practiced without departing in any way from the spirit and scope of the following appended claims.

That which is claimed is:

1. For transmitting audible and written messages, a case attachable to a rail of a bed, said case comprising:

a. two side panels, a bottom panel, contrapositioned walls defining a rear wall attached at the bottom edge thereof to said bottom panel's rear edge and attached at each side edge thereof to the rear edges of each of said two side panels, a front wall attached at the bottom edge thereof to said bottom panel's front edge and attached at each side edge thereof to the front edges of each of said two side panels such that said two side panels, said bottom panel, said rear wall and said front wall form an open container, a flap for holding said case to a rail of a bed, said flap extensible over a rail of a bed, and fastening means for removably attaching said flap to the bottom exterior edge of said rear wall;

b. a plurality of cassette pockets for holding audio cassettes, said cassette pockets attached to the exterior portion of said front wall and each comprising left and right end walls, a bottom pocket wall and a front pocket wall attached together in such manner that each forms an open receptacle;

c. a detachable recorder pocket for holding and carrying an audio cassette recorder, said recorder pocket attached to said front wall between said cassette pockets at the mid-portion on the exterior of said front wall, said recorder pocket comprising left and right end recorder pocket walls, a bottom recorder pocket wall and contrapositioned walls defining a front recorder pocket wall and a back recorder pocket wall attached together at the edges of each such wall in such manner as to form an open receptacle, and second fastening means for detachably fastening said detachable recorder pocket to said front wall;

d. a supplementary recorder pocket centrally attached to the exterior of said flap, said supplementary recorder pocket comprising left and right supplementary pocket end walls, a bottom supplementary pocket wall and a front supplementary pocket wall attached together in such a manner as to form an open receptacle in which an audio cassette recorder may be stored;

e. a shoulder strap for carrying said case, said shoulder strap having two ends wherein one said end is attached to a top edge of one of said two side panels and the other said end is attached to a top edge of the other of said two side panels, said shoulder strap storable in said open case;

f. a battery pocket for storing batteries, said battery pocket attached to said front wall below said detachable recorder pocket at the exterior of said front wall, said battery pocket comprising left and right end battery pocket walls, a bottom battery pocket wall, a front battery pocket wall and a canopy attached together in such a manner as to form a covered receptacle, said canopy attached to the exterior of said front wall and third fastening means for detachably fastening said canopy to said front battery pocket wall;

g. a plurality of identification windows behind which name tags are displayed, said identification windows having a top, a bottom and two ends defining substantially rectangular strips of transparent material wherein the top, bottom, and one end thereof are attached to the exterior of said front wall leaving an open end such that a name tag may be inserted therethrough, said identification window disposed one above each of said cassette pockets and said detachable recorder pocket such that the identification window disposed over said detachable recorder pocket is of larger dimension than those disposed over said cassette pockets.

h. a divider insertable into said case for cataloging documents inside said case, said divider comprising a plurality of planar members of like size and shape and joined together at the bottom and sides thereof, but not at the top thereof, in order to define thereby a plurality of pockets and a top attached to the outer most of said planar members said top being of such size and shape as to cover all pockets defined by said planar members.

2. A case as recited in claim 1 wherein said second fastening means comprises a number of pocket fasteners attached to back recorder pocket wall along the left and right edges thereof and a number of front wall fasteners attached to the outside of said front wall such that when said detachable recorder pocket is attached to said front wall each of said pocket fasteners engages one of said front wall fasteners and further comprising carrying means for holding said detachable recorder pocket to a rail of a bed or arm of a wheel chair, said carrying means comprising at least two straps, each attached to an upper interior portion of said recorder pocket back wall at one end thereof, fourth fastening means for fastening said straps at the other end of said straps to said pocket fasteners such that when said straps are wrapped around an arm of a wheel chair or rail of a bed said fourth fastening means engages said pocket fasteners.

3. A case as recited in claim 1 wherein said detachable recorder pocket includes on an exterior portion of the front wall thereof a decorative illustration.

4. A case as recited in claim 1 wherein said name tags comprise differing colors.

5. A case as recited in claim 2 wherein said fastening means, said second fastening means, said third fastening means and said pocket fasteners and said front wall fasteners making up said third fastening means, and said fourth fastening means all comprise strips of hook and loop fastening material.

\* \* \* \* \*